United States Patent

[11] 3,600,008

[72] Inventor Robert L. Barry
2916 E. Randolph Road, Silver Spring, Md. 20904
[21] Appl. No. 844,802
[22] Filed July 25, 1969
[45] Patented Aug. 17, 1971

[54] SELF-LOCKING OUTLET BOX CONNECTOR
8 Claims, 6 Drawing Figs.
[52] U.S. Cl. ................................................ 285/39,
151/37, 174/65 R, 285/219, 285/391
[51] Int. Cl. ........................................... F16l 35/00
[50] Field of Search ........................................ 174/65 R;
285/219, 158, 40, 39, 391; 151/37

[56] References Cited
UNITED STATES PATENTS
947,185 1/1910 McBean .................... 285/391 X
1,985,327 12/1934 Parks ........................ 285/391 X
3,104,120 9/1963 Myers ....................... 174/65 X
3,306,638 2/1967 Rubin ....................... 285/158

3,370,631 2/1968 James ....................... 151/37
FOREIGN PATENTS
488,308 11/1952 Canada ..................... 174/65
109,074 11/1943 Sweden ..................... 151/37

Primary Examiner—Dave W. Arola
Attorney—John N. Randolph

ABSTRACT: A connector for securing various types of electrical conduit to various types of electrical fixtures, such as, outlet boxes, which is capable of being applied manually to an opening of a wall of the box or fixture without the use of any tool, and which requires no separate fastening for securing the connector in the wall opening. The connector is secured in the box wall opening by a twisting force exerted thereon, is advanced through the opening by threadlike elements of the connector, and includes teeth or prongs which are brought into engagement with a surface of the wall, surrounding the opening, to retain the connector against detachment from the box opening by a normal twisting force exerted in the opposite direction.

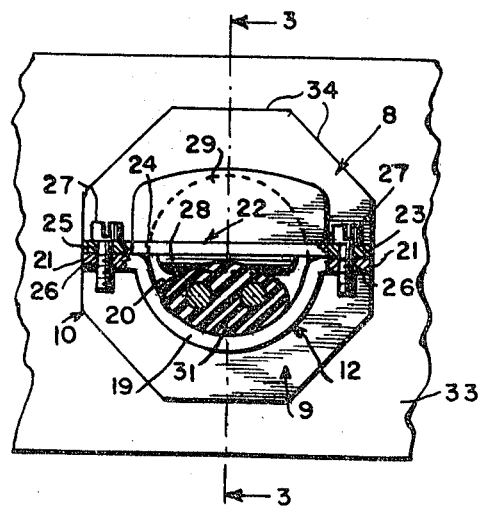
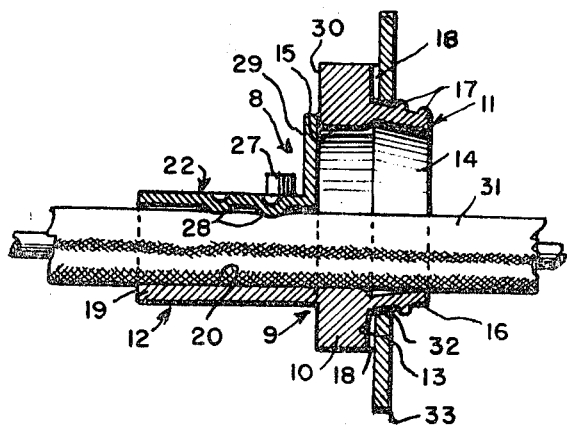
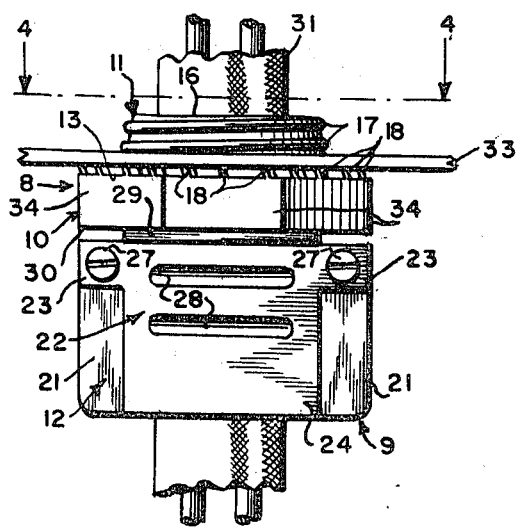
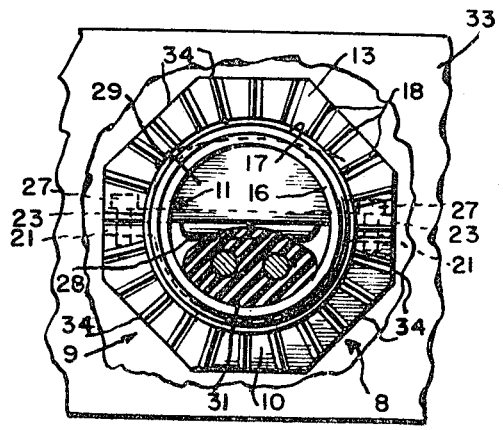
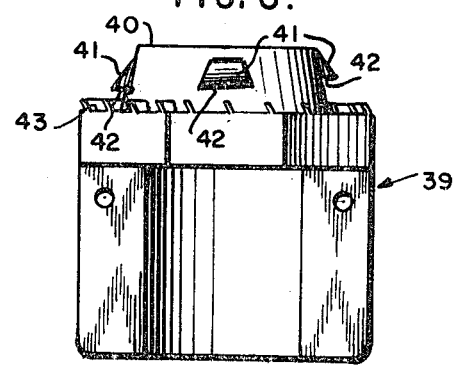
INVENTOR
ROBERT L. BARRY

SELF-LOCKING OUTLET BOX CONNECTOR

SUMMARY

It is a primary object of the present invention to provide a self-locking connector of extremely simple construction for attaching armored cable, heavy wall electrical conduit, electrical metalic tubing, nonmetallic flexible cable, rubber cord, plastic conduit and the like, to various electrical fixtures such as outlet or junction boxes having a wall provided with a connector receiving opening.

More particularly, it is an object of the invention to provide a connector which can be secured in a wall opening of electrical fixtures by a manual twisting force imparted thereto, without the use of any tool and without the use of a separate fastening.

Another object of the invention is to provide a connector having means to resist disengagement thereof from the wall opening by a twisting force imparted thereto in the opposite direction.

Still another object of the invention is to provide a connector having integral threadlike means for advancing a part of the connector through the wall opening when a twisting force in one direction is imparted thereto, and integral means cooperating therewith and with said threadlike elements for gripping the wall around the opening, to resist turning of the connector in an opposite direction and which would result in the detachment of the connector from the box.

Various other objects and advantages of the invention will hereinafter become more fully apparent from the following description of the drawing, illustrating presently preferred embodiments thereof, and wherein:

BRIEF DESCRIPTION OF THE DRAWING

FIG. 1 is an end-elevational view looking toward an outer end of the connector and showing it applied to a wall of an outlet or junction box;

FIG. 2 is a top plan view thereof;

FIG. 3 is a substantially central vertical sectional view taken longitudinally through the connector, substantially along a plane as indicated by the line 3–3 of FIG. 1;

FIG. 4 is an end-elevational view, partly broken away looking toward the other, inner end of the connector, taken substantially along a plane as indicated by the line 4–4 of FIG. 2;

FIG. 5 is a top plan view, with certain of the parts omitted, of a slightly modified embodiment of the connector; and FIG. 6 is a similar view of a second modified form thereof.

DESCRIPTION OF THE PREFERRED EMBODIMENTS

Referring more specifically to the drawing and first with reference to FIGS. 1 through 4, the connector, designated generally 8, as illustrated therein and comprising the invention, includes an elongated unitary body 9 having a ring-shaped intermediate portion 10, a tubular neck 11 which project from one side of the ring portion 10, and a plate member 12 which projects from the opposite side of said ring portion.

The tubular neck 11 projects from a front face 13 of the member 10 and has a bore 14 which registers with the opening 15 of ring member 10. The neck 11 is of frustoconical shape both externally and internally thereof so that the bore 14 and the exterior surface 16 of said neck both taper away from the ring member 10. Said exterior surface 16 has a helical rib or thread 17 preferably composed of more than one but less than two convolutions one end of which terminates at the restricted or outer forward end of the neck 11 and the other end of which is spaced from the front face 13. Said front face 13 is provided with circumferentially spaced apart radially elongated teeth or prongs 18 which may be struck up from the surface of said face and all of which are inclined in the same direction, clockwise as illustrated in the front elevational view, FIG. 4.

The plate 12 is of a width approximately equal to the diameter of the ring member 10, as seen in FIGS. 1 and 2, and includes a downwardly bowed intermediate portion 19 of approximately semicircular shape in cross section or end elevation, to provide a channel 20 which aligns with the bottom half of the opening 15. The plate 12 includes substantially flat coplanar side edge portions 21 forming wings for a purpose which will hereinafter be described.

The connector 8 includes a clamping plate 22 having a forward portion 23, as seen in FIG. 2, of a width corresponding to the width of the plate member 12, and a rear portion 24 of a reduced width but of a width sufficient to bridge the channel 20. The front portion 23, adjacent its lateral ends has unthreaded openings 25, FIG. 1, to register with threaded openings 26 of the wings 21 to receive clamping screws 27 by which the clamping plate 22 is attached to the plate 12. One or more ribs 28 project from the underside of the plate 22 and extend crosswise thereof and may be embossed in said plate, as illustrated. The plate 22 has an upturned flange 29 at its forward end which bears against a portion of the rear face 30 of the ring member 10 and which is of a size to cover the upper half of the opening 15.

A portion of one form of electrical conduit 31, such as a conventional nonmetallic flexible cable, is illustrated in the drawing extending longitudinally through the connector 8. The conduit 31 is passed through the connector 8 before the clamping plate 22 is attached to the plate 12 and positioned with an end thereof disposed at a desired distance beyond the neck 11. The clamping plate 22 is then applied and the fastenings 27 tighten sufficiently to cause the ribs 28 to be pressed into the casing of the conduit for clamping said conduit immovably in the channel 20.

The neck 11 is then inserted inwardly through the knockout opening 32 of a wall 33, of an outlet box or other conventional electrical fixture. The diameter of the forward end of the neck 11 is sufficiently smaller than the opening 32 so that the forward end of the thread or rib 17 can pass through said opening. However, the inner end of the thread 17, which is located adjacent the front face 13, is of a diameter greater than the diameter or the opening 32 so that a twisting force must be exerted on the connector 9 to advance the neck 11 from left to right through the opening 32 to its position of FIG. 3. This twisting force is imparted manually, without the use of any tool, by the fingers of the operator engaging the wings 21 for turning the connector clockwise, as seen in FIG. 1, usually through an arc of approximately 180° or a half revolution. As the front face 13 approaches the outer surface of the wall 33, the teeth or prongs 18 will contact said outer wall surface and will be deflected toward positions more nearly parallel to the face 13 and will assume positions imbedded in the outer surface of the wall 33, to resist rotation of the connector 9 in the opposite direction or counterclockwise, as seen in FIG. 1, for detaching the connector 9 from the wall 33. Thus, as illustrated in FIGS. 2 and 3, when the connector is applied, a part of the wall 33, surrounding the opening 32, is clamped between a part of the rib or thread 17 and the teeth 18. The periphery of the ring member 10 may be provided with wrench lands 34 to receive a wrench or other tool, not shown, to facilitate detachment of the connector 9 from the wall 33, should this be necessary.

It will be noted that the connector 9 is applied and securely fastened to the wall 33 without the use of any tool and without requiring the application of any form of fastening to the neck 11 for retaining said neck in the opening 32.

The portion of the plate 22, covering the channel 20, could be upwardly bowed to accommodate electrical conduits of larger cross-sectional sizes.

FIG. 5 illustrates a slightly modified embodiment of the connector, designated generally 35, the clamping plate of which has been omitted, since it corresponds with the clamping plate 22. The body 36 of the connector 35 differs from the body 9 of the connector 8 only in that the neck 37 is provided with interrupted, circumferentially spaced spiral ribs or thread portions 38 in lieu of the helical rib or thread 17. The connector 35 is applied in the same manner in the opening of a box wall as the connector 8, and the ribs 38 function in the same manner as the rib or thread 17.

FIG. 6 illustrates a second modification of the connector, designated generally 39, and which differs from the connector 8 only in that the neck 40 thereof in lieu of the helical rib or thread 17, is provided on its exterior with circumferentially spaced projections or lugs 41 which are spaced different distances from the forward end of the neck 40, which are spirally inclined and which have substantially flat and spirally inclined inner faces 42 which are spaced different distances from the front face 43, which corresponds to the face 13, and each of which is disposed at an incline relative to the plane of said face 43. Thus, the connector 39 will be secured in a knockout opening of a fixture wall by a twisting force manually imparted thereto in the same manner as the connector 8 and with the lug faces 42 performing the same function as the rib 17. The connectors 35 and 39 are applied by a twisting force in the same direction as the connector 8.

Various modifications and changes are contemplated and may be resorted to without departing from the function or scope of the invention.

I CLAIM AS MY INVENTION:

1. A connector for securing an electrical conduit to an electrical fixture comprising, an elongated body having a ring-shaped intermediate portion provided with a front face and a rear face, a tubular neck projecting from said front face and having an exterior surface of smaller diameter than the ring portion and which tapers uniformly from said front face outwardly to a forward end thereof, means embossed on said exterior surface of the neck adapted to advance the neck through an opening of an electrical fixture wall when a twisting force is imparted in one direction to said body for positioning a part of the fixture wall, surrounding said opening, between a part of said means and said front face, manually engageable means extending from said rear face and adapted to be manually engaged for imparting the twisting force to the body member for advancing the neck through the fixture opening, a clamping member adjustably secured to said manually engageable means and combining therewith to from a passage communicating with the opening of the ring portion and the hollow neck through which an electrical conduit is adapted to extend and in which a part of the conduit is clamped in said passage, and resilient teeth projecting from said front face, said teeth being circumferentially spaced from each other a distance at least equal to twice their circumferential thickness and wherein said connector and wall are so constructed arranged that said teeth are caused to flex by engagement with said wall when said connector is turned in said one direction and embedded in the fixture wall when said connector is turned in a direction opposite said one direction.

2. A connector as in claim 1, said teeth being inclined in a direction opposite to the direction of rotation of the body for advancing the neck through the fixture opening.

3. A connector as in claim 1, said means embossed on the neck comprising a helical rib or thread.

4. A connector as in claim 1, said means embossed on the neck comprising circumferentially spaced spirally extending interrupted threads.

5. A connector as in claim 1, said means embossed on the neck comprising circumferentially spaced spirally arranged lugs having inner faces facing toward said front face, inclined relative thereto and spaced different distances therefrom.

6. A connector as in claim 1, said manually engageable means comprising a plate having an intermediate portion of arcuate cross section defining a channel disposed in alignment with a least a part of the hollow interiors of the ring portion and neck and in which the electrical conduit is received, and substantially flat coplanar side edge portions forming wings adapted to be engaged for imparting torque manually to the body.

7. A connector as in claim 6, said clamping member comprising a plate disposed over said channel having lateral extensions overlying parts of said wings, and threaded fastenings adjustably securing said lateral extensions to the wings.

8. A connector as in claim 7, said plate having transverse ribs on its under side adapted to be embedded in the electrical conduit for anchoring the conduit to the connector body.